(12) United States Patent
Liu (10) Patent No.: US 12,380,009 B2
(45) Date of Patent: Aug. 5, 2025

(54) METHOD AND APPARATUS FOR DATA PROCESSING FOR SOFTWARE PRODUCT

(71) Applicant: Beijing Volcano Engine Technology Co., Ltd., Beijing (CN)

(72) Inventor: Jianhui Liu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/822,682

(22) Filed: Sep. 3, 2024

(65) Prior Publication Data
US 2025/0094302 A1    Mar. 20, 2025

(30) Foreign Application Priority Data

Sep. 20, 2023 (CN) .......................... 202311219453.9

(51) Int. Cl.
G06F 11/30 (2006.01)
G06F 11/34 (2006.01)

(52) U.S. Cl.
CPC ........ *G06F 11/302* (2013.01); *G06F 11/3476* (2013.01); *G06F 2201/86* (2013.01)

(58) Field of Classification Search
CPC . G06F 11/302; G06F 11/3476; G06F 2201/86
See application file for complete search history.

(56) References Cited

U.S. PATENT DOCUMENTS

2019/0095817 A1* 3/2019 Ma .......................... H04L 67/10
2022/0368347 A1   11/2022 Chandak et al.

FOREIGN PATENT DOCUMENTS

| CN | 110968585 A | 4/2020 |
|---|---|---|
| CN | 112613513 A | 4/2021 |
| CN | 112818017 A | 5/2021 |
| CN | 114491217 A | 5/2022 |
| CN | 115934720 A | 4/2023 |

OTHER PUBLICATIONS

China National Intellectual Property Administration, First Office Action for Chinese Application No. 202311219453.9, mailed on May 9, 2025, 15 pages.

\* cited by examiner

*Primary Examiner* — Truong V Vo
(74) *Attorney, Agent, or Firm* — Alleman Hall & Tuttle LLP (57) ABSTRACT

The present application discloses a method for data processing for a software product. The method includes: obtaining event data to be stored, wherein the event data to be stored includes a software product identifier, an event identifier, and at least one event attribute; determining column information of each event attribute of the at least one event attribute in a target table; and storing, into the target table, the event data to be stored, based on the column information of each event attribute in the target table. In the embodiments of the present application, the target table includes a plurality of columns, the plurality of columns include at least a target column, and event attributes carried in at least two of cells included in the target column are different.

17 Claims, 5 Drawing Sheets

| Serial number | Software product identifier | Event identifier | Attribute 1 | Attribute 2 | Attribute 3 | Attribute 4 | Attribute 5 | Attribute 6 |
|---|---|---|---|---|---|---|---|---|
| 1 | Software product 1 | Event 1 | ** | ** | ** | | | |
| 2 | Software product 2 | Event 2 | | | | ** | ** | ** |

| Serial number | Software product identifier | Event identifier | Attribute 1 | Attribute 2 | Attribute 3 | Attribute 4 | Attribute 5 | Attribute 6 |
|---|---|---|---|---|---|---|---|---|
| 1 | Software product 1 | Event 1 | ** | ** | ** | | | |
| 2 | Software product 2 | Event 2 | | | | ** | ** | ** |

METHOD AND APPARATUS FOR DATA PROCESSING FOR SOFTWARE PRODUCT

CROSS-REFERENCE TO RELATED APPLICATION(S)

This application claims priority to Chinese Application No. 202311219453.9 filed in Sep. 20, 2023, the disclosure of which is incorporated herein by reference in its entirety.

FIELD

The present application relates to the field of data processing, and in particular, to a method and apparatus for data processing for a software product.

BACKGROUND

With the development of the computer technology, more and more software products (such as applications) have emerged. When a user uses a software product, some events may occur. An event can be decomposed into "what operation is performed on what module of the software product at what time". For example, a browsing operation is performed on module A1 of software A at hour*minute*second of day*month*year. An event data analysis system can store event data corresponding to a plurality of software products for subsequent analysis or processing of the event data. The event data includes at least one event attribute.

At present, the event data analysis systems can store event data corresponding to the one or more software products mentioned above in the same table when storing the event data, and one piece of event data corresponding to a row in the table. Moreover, during the storage of the event data, columns of the table are associated with event attributes, and one event attribute corresponds to a column in the table. Data carried in respective cells in this column are the event attribute associated with the column. Therefore, when there are a lot of event attributes, there are a lot of columns in the table. A lot of columns in the table will reduce the performance performed by the event data analysis system.

Therefore, there is an urgent need for a solution that can solve the above problems.

SUMMARY

In order to solve or at least solve the above technical problems, embodiments of the present application provide a method and apparatus for data processing.

In a first aspect, the embodiments of the present application provide a method for data processing for a software product. The method includes: obtaining event data to be stored, wherein the event data to be stored includes a software product identifier, an event identifier, and at least one event attribute, the software product identifier is used to identify a software product from which the event data to be stored is generated, the event identifier is used to identify an event corresponding to the event data to be stored, and the event attribute is an attribute of the event; determining column information of each event attribute of the at least one event attribute in a target table, wherein the target table includes a plurality of columns, the plurality of columns include at least a target column, and event attributes carried in at least two of cells included in the target column are different; and storing, into the target table, the event data to be stored, based on the column information of each event attribute in the target table.

Optionally, determining the column information of each event attribute of the at least one event attribute in the target table includes: obtaining metadata corresponding to the software product, wherein the metadata includes corresponding column information of respective event attribute of a number of event attributes corresponding to the software product, in the target table; and determining corresponding column information of each event attribute of the at least one event attribute in the target table based on the metadata.

Optionally, determining the corresponding column information of each event attribute of the at least one event attribute in the target table based on the metadata includes: in a case that the metadata includes the corresponding column information of each event attribute of the at least one event attribute in the target table, obtaining the corresponding column information of each event attribute in the target table from the metadata.

Optionally, determining the corresponding column information of each event attribute of the at least one event attribute in the target table based on the metadata includes: in a case that the metadata does not include corresponding column information of a portion or all of the at least one event attribute in the target table, generating corresponding column information of each event attribute of the portion or all of the event attributes in the target table based on the metadata.

Optionally, the method further includes: adding, into the metadata, the corresponding column information of each event attribute of the portion or all of the event attributes in the target table.

Optionally, the method further includes: receiving a first query statement, wherein the first query statement is used to query a target event attribute corresponding to the software product; determining target column information of the target event attribute in the target table based on the metadata; obtaining a second query statement comprising the target column information by processing the first query statement based on the target column information; and querying the target event attribute based on the second query statement.

In a second aspect, the embodiments of the present application provide an apparatus for data processing for a software product. The apparatus includes: an obtaining unit configured to obtain event data to be stored, wherein the event data to be stored includes a software product identifier, an event identifier, and at least one event attribute, the software product identifier is used to identify a software product from which the event data to be stored is generated, the event identifier is used to identify an event corresponding to the event data to be stored, and the event attribute is an attribute of the event; a first determining unit configured to determine column information of each event attribute of the at least one event attribute in a target table, wherein the target table includes a plurality of columns, the plurality of columns include at least a target column, and event attributes carried in at least two of cells included in the target column are different; and a storage unit configured to store, into the target table, the event data to be stored, based on the column information of each event attribute in the target table.

Optionally, the first determining unit is configured to: obtain metadata corresponding to the software product, wherein the metadata includes corresponding column information of respective event attribute of a number of event attributes corresponding to the software product, in the target table; and determine corresponding column information of each event attribute of the at least one event attribute in the target table based on the metadata.

Optionally, determining the corresponding column information of each event attribute of the at least one event attribute in the target table based on the metadata includes: in a case that the metadata includes the corresponding column information of each event attribute of the at least one event attribute in the target table, obtaining the corresponding column information of each event attribute in the target table from the metadata.

Optionally, determining the corresponding column information of each event attribute of the at least one event attribute in the target table based on the metadata includes: in a case that the metadata does not include corresponding column information of a portion or all of the at least one event attribute in the target table, generating corresponding column information of each event attribute of the portion or all of the event attributes in the target table based on the metadata.

Optionally, the apparatus further includes: a metadata update unit configured to add, into the metadata, the corresponding column information of each event attribute of the portion or all of the event attributes in the target table.

Optionally, the apparatus further includes: a receiving unit configured to receive a first query statement, wherein the first query statement is used to query a target event attribute corresponding to the software product; a second determining unit configured to determine target column information of the target event attribute in the target table based on the metadata; a third determining unit configured to obtain a second query statement comprising the target column information by processing the first query statement based on the target column information; and a query unit configured to query the target event attribute based on the second query statement.

In a third aspect, the embodiments of the present application provide an electronic device. The device includes a processor and a memory, and the processor is configured to execute instructions stored in the memory to cause the device to perform any one of the methods in the above first aspect.

In a fourth aspect, the embodiments of the present application provide a computer-readable storage medium including instructions. The instructions instruct a device to perform any one of the methods in the above first aspect.

In a fifth aspect, the embodiments of the present application provide a computer program product. The computer program product, when run on a computer, causes the computer to perform any one of the methods in the above first aspect.

Compared with the prior art, the embodiments of the present application have the following advantages. The embodiments of the present application provide a method for data processing. The method includes: obtaining event data to be stored, wherein the event data to be stored includes a software product identifier, an event identifier, and at least one event attribute, wherein the event data to be stored includes a software product identifier, an event identifier, and at least one event attribute, the software product identifier is used to identify a software product from which the event data to be stored is generated, the event identifier is used to identify an event corresponding to the event data to be stored, and the event attribute is an attribute of the event. After the event data to be stored is obtained, the column information of each event attribute of the at least one event attribute in a target table can be determined. After the column information of each event attribute in the target table is determined, the event data to be stored is stored into the target table based on the column information of each event attribute in the target table. In the embodiments of the present application, the target table includes a plurality of columns, the plurality of columns include at least a target column, and event attributes carried in at least two of cells included in the target column are different. In other words, in the embodiments of the present application, the columns in the target table are no longer associated with a respective event attribute, and different cells of the target column can carry different event attributes, so that the number of columns used for storing event data can be reduced. Correspondingly, the performance that can be provided by an event data analysis system can be improved.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments recorded in the present application, and a person of ordinary skill in the art may still derive other drawings from the accompanying drawings without creative efforts.

DETAILED DESCRIPTION OF EMBODIMENTS

In order to make a person skilled in the art to better understand the solutions of the present application, the technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

Figure 1:
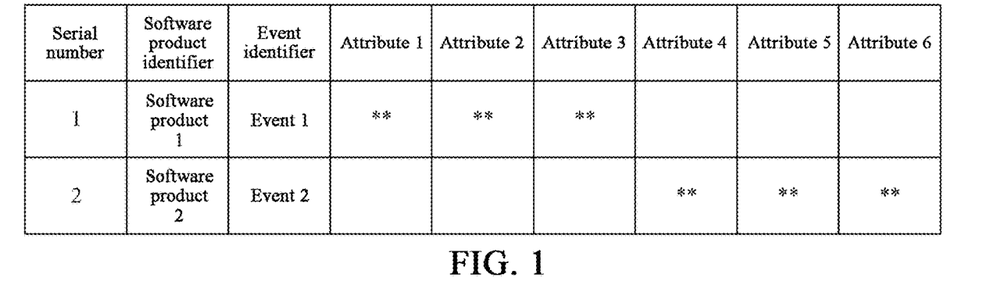
FIG. 1 is a schematic diagram of a table used for storing event data according to an embodiment of the present application.

After research, the inventor of the present application has found that during the storage of event data in an event data analysis system, columns of the table are associated with event attributes, and one event attribute corresponds to one column in the table. Data carried in various cells in this column each is the event attribute associated with the column. Therefore, when there are many event attributes, there are many columns in the table. An explanation can be made in conjunction with FIG. 1. FIG. 1 is a schematic diagram of a table used for storing event data according to an embodiment of the present application.

As shown in FIG. 1, Table 1 includes several columns. The first column represents serial numbers of event data.

The event data can be numbered from 1. The second column represents an identifier of a software product that generates the event data, and the third column represents an event identifier. The columns starting from the fourth column are used for storing values of event attributes, and each column is associated with one event attribute. As shown in FIG. 1, the fourth column is associated with attribute 1, the fifth column is associated with attribute 2, the sixth column is associated attribute 3, the seventh column is associated with attribute 4, the eighth column is associated with attribute 5, and the ninth column is associated with attribute 6.

In an example, in a case that event 1 of software product A includes attribute 1, attribute 2, and attribute 3, a storage mode of event data 1 corresponding to event 1 in the table is as shown in FIG. 1. In a case that event 2 of software product B includes attribute 4, attribute 5, and attribute 6, a storage mode of event data 2 corresponding to event 2 in the table is as shown in FIG. 1. In FIG. 1, specific values of the various event attributes in cells are represented by "**".

In practical applications, in a case that a software product can generate a large number of events, correspondingly, the software product corresponds to a large number of event attributes. Moreover, an event data analysis system can store data generated by a plurality of software products, which leads to a huge number of event attributes that need to be stored in the event data analysis system. However, due to the fact that when the event data analysis system stores event data, columns of a table are associated with event attributes, and one event attribute corresponds to one column in the table, so that there are many columns in the table.

Many columns in the table will reduce the performance that can be provided by the event data analysis system. Since the event data analysis system may regularly generate corresponding event data files based on the table, many columns in the table will reduce the efficiency of generating event data files. Correspondingly, in a case that the event data analysis system receives a query message for event data, the event data analysis system cannot timely return a corresponding query result based on the generated event data files, thereby reducing the performance that can be provided by the data analysis system.

To solve the above problems, the embodiments of the present application provide a method and apparatus for data processing, which can improve the performance that can be provided by the data analysis system.

Various nonrestrictive implementations of the present application will be explained in detail below in conjunction with the accompanying drawings.

Exemplary Method

Figure 2:
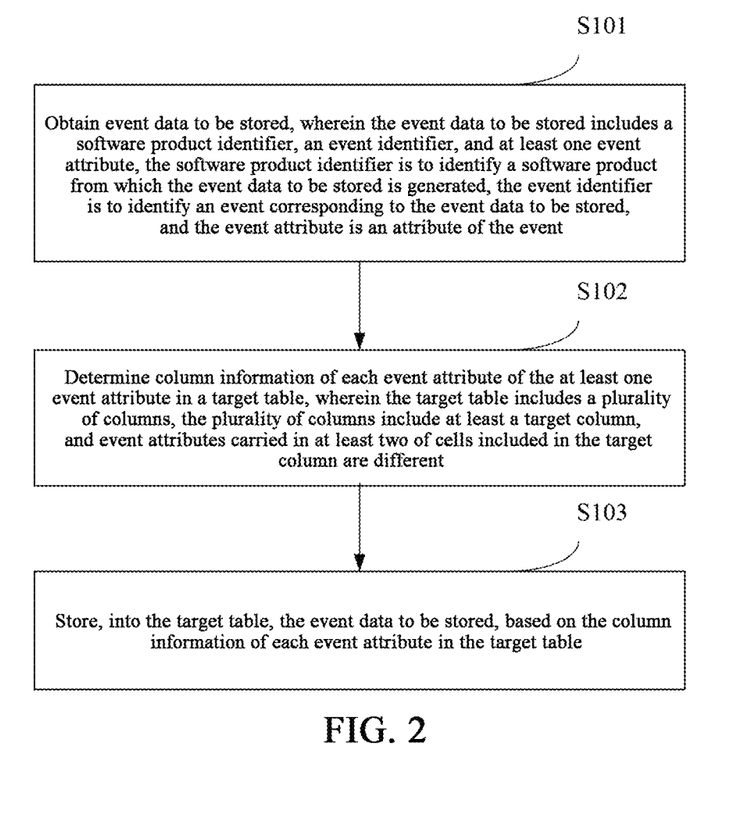
FIG. 2 is a schematic flowchart of a method for data processing for a software product according to an embodiment of the present application.

Referring to FIG. 2, this figure is a schematic flowchart of a method for data processing for a software product according to an embodiment of the present application. In an example, the method can be performed by a data processing service. The data processing service is used for storing event data to be stored into a target table in an event data analysis system. The data processing service can be understood as a functional module configured to process data.

In this embodiment, the method may, for example, include the following steps: S101-S103.

S101: Event data to be stored is obtained, wherein the event data to be stored includes a software product identifier, an event identifier, and at least one event attribute. The software product identifier is used to identify a software product from which the event data to be stored is generated, the event identifier is used to identify an event corresponding to the event data to be stored, and the event attribute is an attribute of the event.

In this embodiment of the present application, after a user triggers a corresponding operation based on the software product, the software product may generate the event data to be stored and send the event data to be stored to the data processing service. In an example, the software product can directly send the event data to be stored to the data processing service. In another example, the software product can further send the event data to be stored to the data processing service through an event data receiving service and a message-oriented middleware. Specifically, the software product can send the event data to be stored to the event data receiving service, and the event data receiving service sends the event data to be stored to the data processing service through message-oriented middleware. The event data receiving service can be understood as a functional module that provides a data receiving function, and the message-oriented middleware is used for providing a message transmission channel for the data processing service and the event data receiving service.

In this embodiment of the present application, the event data to be stored includes a software product identifier, an event identifier, and at least one event attribute. The software product identifier is used to identify the software product that generates the event data to be stored. For example, the software product identifier can be the name of the software product that generates the event data to be stored. The event identifier is used to identify an event corresponding to the event data to be stored. For example, the event identifier is the event name of the event corresponding to the event data to be stored. The at least one event attribute is an attribute of the event corresponding to the event data to be stored. This embodiment of the present application does not specifically limit an event attribute. The event attribute can be related to its corresponding event. For example, in a case that the event is browsing, the event attribute can be an attribute related to a browsing object. For example, in a case that the browsing object is a video, the event attribute can include: the name of the video, a video duration, the type of the video, and the like. For another example, in a case that the browsing object is a book, the event attribute can include: the name of the book, version information of the book, the author of the book, and the like.

S102: Column information of each event attribute of the at least one event attribute in a target table is determined, wherein the target table includes a plurality of columns, the plurality of columns include at least a target column, and event attributes carried in at least two of cells included in the target column are different.

After the event data to be stored is obtained, the data processing service can further store, into the target table, the event data to be stored. Specifically, the data processing service may first determine the column information of each event attribute of the at least one event attribute in the target table.

In the embodiments of the present application, the target table can include a plurality of columns, the plurality of columns include at least a target column, and event attributes carried in at least two of cells included in the target column are different. In other words, in the embodiments of the present application, the columns in the target table are no longer associated with one event attribute respectively, and different cells of the target column can carry different event attributes, so that the number of columns in the target table can be reduced. Hereafter, a specific implementation of S102 will be introduced.

In an example, in specific implementation, S102 may include following steps A1-A2.

A1: Metadata corresponding to the software product is obtained, wherein the metadata includes corresponding column information of respective event attribute of a number of event attributes corresponding to the software product, in the target table.

A2: The corresponding column information of each event attribute of the at least one event attribute in the target table is determined based on the metadata.

In an example, the data processing service may store metadata respectively corresponding to a plurality of software products. The metadata of a software product is used for indicating the corresponding column information of the respective event attribute corresponding to the software product, in the target table. In an example, the metadata may include event attribute and corresponding column index of the event attribute in the target table. The column index may be, for example, column number. For example, it can be understood in conjunction with Table 1 below. Table 1 is an illustration of the metadata corresponding to software product A according to an embodiment of the present application.

TABLE 1

| Serial number | Event attribute | Column index |
| --- | --- | --- |
| 1 | Attribute 1 | 1 |
| 2 | Attribute 2 | 2 |
| 3 | Attribute 3 | 3 |

An event attribute corresponding to a software product means an event attribute of an event generated by the software product. For an event attribute, the corresponding column information of the event attribute in the target table is used for indicating a specific column, to which a cell that stores the event attribute belongs, during the storage of the event attribute, in the target table.

The data processing service can use the software product identifier included in the event data to be stored as an index to query the metadata stored therein, thus obtaining the metadata corresponding to the software product that generates the event data to be stored. Further, the column information of each event attribute of the at least one event attribute in the target table is determined based on the queried metadata.

In this embodiment of the present application, in specific implementation, step A2 may have various implementations. Two possible implementations will be introduced below. In a possible implementation, in a case that the metadata includes the corresponding column information of each event attribute of the at least one event attribute in the target table, in other words, in a case that the corresponding column information of each event attribute of the at least one event attribute in the target table can be queried based on the metadata, in this case, the corresponding column information of each event attribute in the target table can be directly obtained from the metadata. For example, it can be understood in conjunction with Table 1. Assuming that the event data to be stored includes attribute 1, attribute 2, and attribute 3, it can be determined, based on the metadata shown in Table 1, that the column index corresponding to attribute 1 is 1, the column index corresponding to attribute 2 is 2, and the column index corresponding to attribute 3 is 3.

In another possible implementation, in a case that the metadata does not include the corresponding column information of a portion or all of the at least event attribute in the target table, in other words, in a case that the corresponding column information of the above portion or all of the event attributes in the target table cannot be determined based on the metadata, the data processing service can generate corresponding column information of each of the above portion or all of the event attributes in the target table based on the current metadata. For example, the corresponding column indexes of the above portion or all of the event attributes in the target table can be determined based on the maximum column index included in the metadata in a manner that the column indexes gradually increase in sequence. For example, it can be understood in conjunction with Table 1. Assuming that the event data to be stored includes attribute 1, attribute 4, and attribute 5, based on the metadata shown in Table 1, it can be determined that the column index corresponding to attribute 1 is 1, but it cannot be determined that the column indexes corresponding to attribute 4 and attribute 5 are 2. Therefore, the column indexes corresponding to attribute 4 and attribute 5 in the target table can be determined based on the maximum column index 3 included in the metadata shown in Table 1 in the manner that the column indexes gradually increase in sequence. For example, the column index corresponding to attribute 4 in the target table is determined to be 4, and the column index corresponding to attribute 5 in the target table is determined to be 5.

In an example, after the corresponding column information of each event attribute of the above portion or all of the event attributes in the target table is generated based on the metadata, the column information, the corresponding column information of each event attribute of the above portion or all of the event attributes in the target table can be further added into the metadata to obtain updated metadata. In this way, when the data processing service subsequently receives the event data generated by the application, the corresponding column information of event attribute in the event data received subsequently in the target table can be determined based on the updated metadata. For example, after the column index corresponding to attribute 4 in the target table and the column index corresponding to attribute 5 in the target table are added into the metadata shown in Table 1, the metadata shown in Table 1 can be updated to that shown in Table 2.

TABLE 2

| Serial number | Event attribute | Column index |
| --- | --- | --- |
| 1 | Attribute 1 | 1 |
| 2 | Attribute 2 | 2 |
| 3 | Attribute 3 | 3 |
| 4 | Attribute 4 | 4 |
| 5 | Attribute 5 | 5 |

In another example, in a case that the data processing service does not store the metadata corresponding to the software product that generates the event data to be stored, in this case, the data processing service can generate a column index of each event attribute of at least one event attribute in the target table, starting from a preset index, in a manner that index values gradually increase in sequence. For example, assuming that the event data to be stored includes attribute 1, attribute 2, and attribute 3, the data processing service can generate column index 1, column index 2, and column index 3, and determine column index 1 as a column index corresponding to attribute 1, column index 2 as a column index corresponding to attribute 2, and column index 3 as a column index corresponding to attribute 3. Correspondingly, based on the column index of each event attribute of the at least one event attribute in the target table, the data processing service can further generate metadata corresponding to the software product that generates the event data to be stored. In this way, when the data processing service subsequently receives event data generated by the application, corresponding column information of event attribute in the event data received subsequently in the target table can be determined based on the generated metadata.

Regarding a column index, it should be noted that it is used for indexing a column in the target table. There is a correspondence relationship between the value of the column index and the number of columns in the target table. Through the column index, it is possible to uniquely index a column in the target table. For example, column index 1 can be indexed to the first column in the target table, column index 2 can be indexed to the second column in the target table, and so on. For another example, during storage of event to be stored, the first column in the target table is used for storing serial number information, the second column is used for storing the software product identifier of the software product that generates the event data, the third column is used for storing the event identifier corresponding to the event data, and the event attributes are stored starting from the fourth column. In this case, column index 1 can be indexed to the fourth column in the target table, column index 2 can be indexed to the fifth column in the target table, and so on.

In addition, the metadata is not limited to the forms shown in Table 1 and Table 2. In an example, the metadata may include a column name in addition to the content shown in Table 1 and Table 2. For example, the column name may be slot. In this case, the metadata can be as shown in Table 3 below:

TABLE 3

| Serial number | Event attribute | Column name | Column index |
|---|---|---|---|
| 1 | Attribute 1 | slot | 1 |
| 2 | Attribute 2 | slot | 2 |
| 3 | Attribute 3 | slot | 3 |
| 4 | Attribute 4 | slot | 4 |
| 5 | Attribute 5 | slot | 5 |

After column information of each event attribute in the target table is obtained in S102, S103 can be further performed, so that the storage of the event data to be stored is achieved.

S103: The event data to be stored is stored into the target table based on the column information of each event attribute in the target table.

During the storage of the event data to be stored, a blank row with a smallest number of blank rows in the target table can be first determined as target rows for storing the event data to be stored. Further, based on the target row and the column information of the each event attribute in the target table, cells for storing the respective event attributes are determined, and the respective event attributes are stored into the corresponding cells, thus achieving the storage of the event data to be stored.

From the above description, in the embodiments of the present application, the columns in the target table are no longer associated with one event attribute respectively, and different cells of the target column can carry different event attributes, so that the number of columns used for storing event data can be reduced. Correspondingly, the performance that can be provided by an event data analysis system can be improved.

In this embodiment of the present application, the data processing service can not only store the event data, but also support querying of the event data. Next, a method for data query performed by the data processing service will be introduced.

Figure 3:
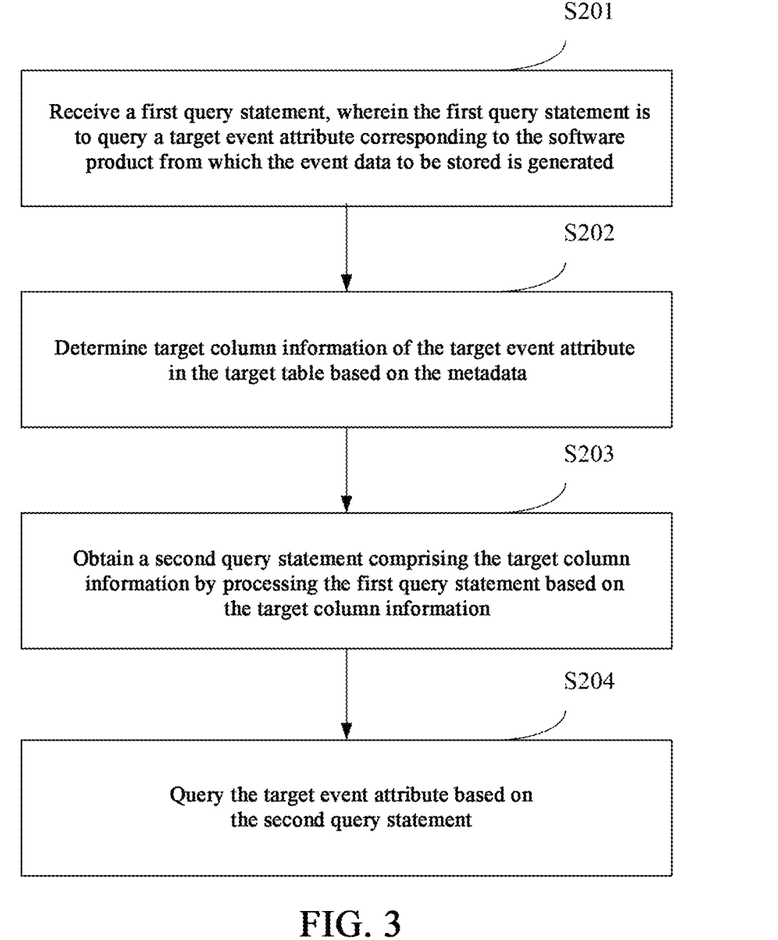
FIG. 3 is a schematic flowchart of a method for data query for a software product according to an embodiment of the present application.

Referring to FIG. 3, this figure is a schematic flowchart of a method for data query for a software product according to an embodiment of the present application. As shown in FIG. 3, the method may include following S201-S204.

S201: A first query statement is received, wherein the first query statement is used to query a target event attribute corresponding to the software product that generates the event data to be stored.

In an example, the first query statement may be a query statement entered by a user on a corresponding query statement enter interface. The first query statement may include the software product identifier of the software product that generates the event data to be stored and an identifier of the target event attribute.

This embodiment of the present application does not specifically limit the first query statement. The first query statement can be a Structured Query Language (SQL) statement.

S202: Target column information of the target event attribute in the target table is determined based on the metadata.

After the first query statement is received, the data processing service can use the software product identifier included in the first query statement as an index to query and obtain the metadata corresponding to the software product identifier. Further, the target column information of the target event attribute in the target table is determined based on the metadata. Regarding the metadata, it can be referred to the relevant descriptions described above, and will not be elaborated here. The target column information can be, for example, column indexes of the cells or storing the target event attributes.

S203: A second query statement comprising the target column information can be obtained by processing the first query statement based on the target column information.

S204: The target event attribute is queried based on the second query statement.

After the target column information is determined, the first query statement can be processed based on the target column information. For example, the target event attribute in the first query statement is replaced with the target column information to obtain the second query statement. Further, the target event attribute is queried based on the second query statement. In this way, a user can enter the first query statement according to a traditional query statement enter mode. The data processing service processes the first query statement based on the metadata to achieve the query of the target event attribute. The user can achieve the query of the target event attribute without knowing the metadata.

The above has introduced the method for data processing according to the embodiments of the present application. Next, the method for data processing according to the embodiments of the present application will be introduced in conjunction with a specific scenario.

Figure 4:
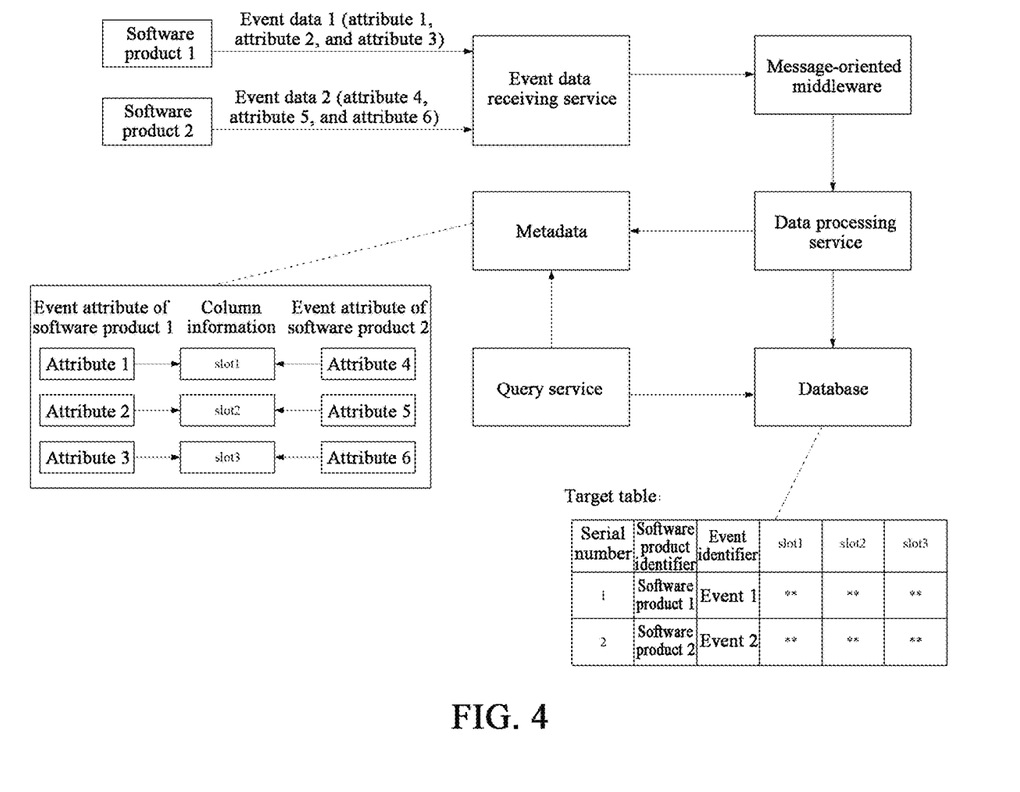
FIG. 4 is a schematic diagram of a process of a method for data storage for a software product according to an embodiment of the present application.

Referring to FIG. 4, this figure is a schematic diagram of a process of a method for data storage for a software product according to an embodiment of the present application. As shown in FIG. 4, the event data receiving service can receive event data 1 sent by software product 1. Event data 1 includes: a software product identifier of software product 1, an identifier of event 1, attribute 1, attribute 2, and attribute 3. The event data receiving service sends event data 1 to the data processing service through the message-oriented middleware. The data processing service stores event data 1 in the target table based on the metadata shown in query table 1. The event data receiving service, the message-oriented middleware, and the data processing service can all be functional modules included in the event data analysis service.

Similarly, the event data analysis service can receive event data 2 sent by software product 2. Event data 2 includes: a software product identifier of software product 2, an identifier of event 2, attribute 4, attribute 5, and attribute 6. The event data analysis service sends event data 2 to the data processing service through the message-oriented middleware. The data processing service queries the metadata corresponding to application 2 (as shown in Table 4 below) and stores event data 2 into the target table in a database.

TABLE 4

| Serial number | Event attribute | Column name | Column index |
|---|---|---|---|
| 1 | Attribute 4 | slot | 1 |
| 2 | Attribute 5 | slot | 2 |
| 3 | Attribute 6 | slot | 3 |

As shown in FIG. 4, slot 1 of the target table can store attribute 1 of event data 1 and attribute 4 of event data 2, slot 2 of the target table can store attribute 2 of event data 1 and attribute 5 of event data 2, and slot 3 of the target table can store attribute 3 of event data 1 and attribute 6 of event data 2.

The columns for storing the event attributes in the target table include three columns (slot 1, slot 2, and slot 3), which can store event data 1 and event data 2. However, in a case that a traditional technology is used, six columns are required to store attribute 1 to attribute 6 respectively (as shown in FIG. 1). Therefore, this solution can effectively reduce the number of columns in the target table.

In addition, the event data analysis service may further include a query service. The query service can be used for obtaining the second query statement based on the metadata and the first query statement entered by a user, thereby querying the database based on the second query statement. A query service can be understood as a functional module included in the event data analysis service.

The database described in FIG. 4 can be, for example, a columnar storage database, which will not be elaborated here.

Exemplary Device

Based on the method according to the above embodiment, the embodiments of the present application further provide an apparatus. The apparatus will be introduced below in conjunction with the accompanying drawings.

Figure 5:
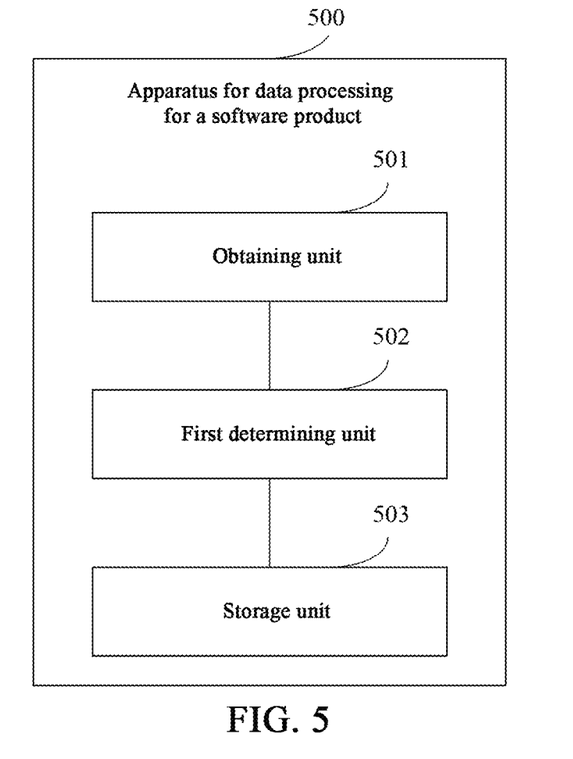
FIG. 5 is a schematic structural diagram of an apparatus for data processing for a software product according to an embodiment of the present application.

Referring to FIG. 5, this figure is a schematic structural diagram of an apparatus for data processing for a software product according to an embodiment of the present application. The apparatus 500 may specifically include, for example, an obtaining unit 501, a first determining unit 502, and a storage unit 503.

The obtaining unit 501 is configured to obtain event data to be stored, wherein the event data to be stored includes a software product identifier, an event identifier, and at least one event attribute. The software product identifier is used to identify a software product from which the event data to be stored is generated, the event identifier is used to identify an event corresponding to the event data to be stored, and the event attribute is an attribute of the event.

The first determining unit 502 is configured to determine column information of each event attribute of the at least one event attribute in a target table, wherein the target table includes a plurality of columns, the plurality of columns include at least a target column, and event attributes carried in at least two of cells included in the target column are different.

The storage unit 503 is configured to store, into the target table, the event data to be stored, based on the column information of each event attribute in the target table.

Optionally, the first determining unit 502 is configured to obtain metadata corresponding to the software product, wherein the metadata includes corresponding column information of respective event attribute of a number of event attributes corresponding to the software product, in the target table; and to determine corresponding column information of each event attribute of the at least one event attribute in the target table based on the metadata.

Optionally, determining the corresponding column information of each event attribute of the at least one event attribute in the target table based on the metadata includes: in a case that the metadata includes the corresponding column information of each event attribute of the at least one event attribute in the target table, obtaining the corresponding column information of each event attribute in the target table from the metadata.

Optionally, determining the corresponding column information of each event attribute of the at least one event attribute in the target table based on the metadata includes: in a case that the metadata does not include corresponding column information of a portion or all of the at least one event attribute in the target table, generating corresponding column information of each event attribute of the portion or all of the event attributes in the target table based on the metadata.

Optionally, the apparatus further includes a metadata update unit configured to add, into the metadata, the corresponding column information of each event attribute of the portion or all of the event attributes in the target table.

Optionally, the apparatus further includes: a receiving unit configured to receive a first query statement, wherein the first query statement is used to query a target event attribute corresponding to the software product; a second determining unit configured to determine target column information of the target event attribute in the target table based on the metadata; a third determining unit configured to obtain a second query statement comprising the target column information by processing the first query statement based on the target column information; and a query unit configured to query the target event attribute based on the second query statement.

The apparatus 500 is an apparatus corresponding to the method for data processing for the software product according to the above method embodiment. Specific implementations of all the units of the apparatus 500 belong to the same concept of the above method embodiment. Therefore, the specific implementation of all the units of the apparatus 500 can be found in the related descriptions of the above method embodiment, and will not be elaborated here.

The embodiments of the present application further provide an electronic device. The electronic device includes a processor and a memory.

The processor is configured to execute instructions stored in the memory to cause the device to perform the method for data processing for the software product according to the above method embodiment.

The embodiments of the present application provide a computer-readable storage medium including instructions. The instructions instruct a device to perform the method for data processing for the software product according to the above method embodiment.

The embodiments of the present disclosure provide a computer program product. The computer program product, when run on a computer, causes the computer to perform the method for data processing for the software product according to the above method embodiment.

Those skilled in the art will easily come up with other implementations of the present application after considering this specification and implementing the invention disclosed here. The present application aims to cover any variations, uses, or adaptive changes of the present application, and these variations, uses, or adaptive changes follow the general principles of the present application and include common knowledge or customary technical means in the technical field that are not disclosed herein. The specification and the embodiments are considered as merely exemplary, and the scope and spirit of the present application are pointed out in the following claims.

It should be understood that the present application is not limited to the precise structures that have been described above and shown in the drawings, and various modifications and changes can be made without departing from the scope of the present application. The scope of the present application is subject only to the appended claims.

The foregoing descriptions are merely preferred embodiments of the present application, but are not intended to limit present application. Any modification, equivalent replacement, or improvement made within the spirit and principle of present application shall fall within the protection scope of present application.

I claim:

1. A method for data processing for a software product, comprising:
   obtaining event data to be stored, wherein the event data to be stored comprises a software product identifier, an event identifier, and at least one event attribute, the software product identifier is used to identify a software product from which the event data to be stored is generated, the event identifier is used to identify an event corresponding to the event data to be stored, and the event attribute is an attribute of the event;
   determining column information of each event attribute of the at least one event attribute in a target table, wherein the target table comprises a plurality of columns, the plurality of columns comprise at least a target column, and event attributes carried in at least two of cells comprised in the target column are different; and
   storing, into the target table, the event data to be stored, based on the column information of each event attribute in the target table,
   wherein determining the column information of each event attribute of the at least one event attribute in the target table comprises:
   obtaining metadata corresponding to the software product, wherein the metadata comprises corresponding column information of a respective event attribute of a plurality of event attributes corresponding to the software product, in the target table, and the metadata has been stored as a table different from the target table before obtaining the event data to be stored; and
   determining corresponding column information of each event attribute of the at least one event attribute in the target table based on the metadata.

2. The method according to claim 1, wherein determining the corresponding column information of each event attribute of the at least one event attribute in the target table based on the metadata comprises:
   in a case that the metadata comprises the corresponding column information of each event attribute of the at least one event attribute in the target table, obtaining the corresponding column information of each event attribute in the target table from the metadata.

3. The method according to claim 1, wherein determining the corresponding column information of each event attribute of the at least one event attribute in the target table based on the metadata comprises:
   in a case that the metadata does not comprise corresponding column information of a portion or all of the at least one event attribute in the target table, generating corresponding column information of each event attribute of the portion or all of the event attributes in the target table based on the metadata.

4. The method according to claim 3, further comprising:
   adding, into the metadata, the corresponding column information of each event attribute of the portion or all of the event attributes in the target table.

5. The method according to claim 1, further comprising:
   receiving a first query statement, wherein the first query statement is used to query a target event attribute corresponding to the software product;
   determining target column information of the target event attribute in the target table based on the metadata;
   obtaining a second query statement comprising the target column information by processing the first query statement based on the target column information; and
   querying the target event attribute based on the second query statement.

6. An electronic device comprising one or more processors and a memory,
   wherein the one or more processors are configured to, when executing instructions stored in the memory:
   obtain event data to be stored, wherein the event data to be stored comprises a software product identifier, an event identifier, and at least one event attribute, the software product identifier is used to identify a software product from which the event data to be stored is generated, the event identifier is used to identify an event corresponding to the event data to be stored, and the event attribute is an attribute of the event;
   determine column information of each event attribute of the at least one event attribute in a target table, wherein the target table comprises a plurality of columns, the plurality of columns comprise at least a target column, and event attributes carried in at least two of cells comprised in the target column are different; and
   store, into the target table, the event data to be stored, based on the column information of each event attribute in the target table,
   wherein the one or more processors are configured to:
   obtain metadata corresponding to the software product, wherein the metadata comprises corresponding column information of a respective event attribute of a plurality of event attributes corresponding to the software product, in the target table, and the metadata has been stored as a table different from the target table before obtaining the event data to be stored; and determine corresponding column information of each event attribute of the at least one event attribute in the target table based on the metadata.

7. The electronic device according to claim 6, wherein the one or more processors are configured to:

in a case that the metadata comprises the corresponding column information of each event attribute of the at least one event attribute in the target table, obtain the corresponding column information of each event attribute in the target table from the metadata.

8. The electronic device according to claim 6, wherein the one or more processors are configured to:

in a case that the metadata does not comprise corresponding column information of a portion or all of the at least one event attribute in the target table, generate corresponding column information of each event attribute of the portion or all of the event attributes in the target table based on the metadata.

9. The electronic device according to claim 8, wherein the one or more processors are further configured to:

add, into the metadata, the corresponding column information of each event attribute of the portion or all of the event attributes in the target table.

10. The electronic device according to claim 6, wherein the one or more processors are further configured to:

receive a first query statement, wherein the first query statement is used to query a target event attribute corresponding to the software product; and determine target column information of the target event attribute in the target table based on the metadata.

11. The electronic device according to claim 10, wherein the one or more processors are further configured to:

obtain a second query statement comprising the target column information by processing the first query statement based on the target column information; and query the target event attribute based on the second query statement.

12. A non-transitory computer-readable storage medium comprising instructions, wherein the instructions configure a device to:

obtain event data to be stored, wherein the event data to be stored comprises a software product identifier, an event identifier, and at least one event attribute, the software product identifier is used to identify a software product from which the event data to be stored is generated, the event identifier is used to identify an event corresponding to the event data to be stored, and the event attribute is an attribute of the event;

determine column information of each event attribute of the at least one event attribute in a target table, wherein the target table comprises a plurality of columns, the plurality of columns comprise at least a target column, and event attributes carried in at least two of cells comprised in the target column are different; and store, into the target table, the event data to be stored, based on the column information of each event attribute in the target table, wherein the device is configured to:

obtain metadata corresponding to the software product, wherein the metadata comprises corresponding column information of a respective event attribute of a plurality of event attributes corresponding to the software product, in the target table, and the metadata has been stored as a table different from the target table before obtaining the event data to be stored; and determine corresponding column information of each event attribute of the at least one event attribute in the target table based on the metadata.

13. The non-transitory computer-readable storage medium according to claim 12, wherein the device is configured to:

in a case that the metadata comprises the corresponding column information of each event attribute of the at least one event attribute in the target table, obtain the corresponding column information of each event attribute in the target table from the metadata.

14. The non-transitory computer-readable storage medium according to claim 12, wherein the device is configured to:

in a case that the metadata does not comprise corresponding column information of a portion or all of the at least one event attribute in the target table, generate corresponding column information of each event attribute of the portion or all of the event attributes in the target table based on the metadata.

15. The non-transitory computer-readable storage medium according to claim 14, wherein the device is further configured to:

add, into the metadata, the corresponding column information of each event attribute of the portion or all of the event attributes in the target table.

16. The non-transitory computer-readable storage medium according to claim 12, wherein the device is further configured to:

receive a first query statement, wherein the first query statement is used to query a target event attribute corresponding to the software product; and determine target column information of the target event attribute in the target table based on the metadata.

17. The non-transitory computer-readable storage medium according to claim 16, wherein the device is further configured to:

obtain a second query statement comprising the target column information by processing the first query statement based on the target column information; and query the target event attribute based on the second query statement.

* * * * *